(12) United States Patent
Mahmoud et al.

(10) Patent No.: US 10,323,173 B2
(45) Date of Patent: *Jun. 18, 2019

(54) METHOD FOR REMOVING IRON SULFIDE SCALE FROM OIL WELL EQUIPMENT

(71) Applicant: King Fahd University of Petroleum and Minerals, Dhahran (SA)

(72) Inventors: Mohamed Ahmed Nasreldin Mahmoud, Dhahran (SA); Badr Salem Ba Geri, Dhahran (SA); Ibnelwaleed A. Hussein, Doha (QA)

(73) Assignee: King Fahd University of Petroleum and Minerals, Dhahran (SA)

( * ) Notice: Subject to any disclaimer, the term of this patent is extended or adjusted under 35 U.S.C. 154(b) by 134 days.

This patent is subject to a terminal disclaimer.

(21) Appl. No.: 15/697,888

(22) Filed: Sep. 7, 2017

(65) Prior Publication Data

US 2017/0362492 A1 Dec. 21, 2017

Related U.S. Application Data

(63) Continuation of application No. 14/993,563, filed on Jan. 12, 2016, now Pat. No. 9,783,728.

(51) Int. Cl.
*E21B 37/06* (2006.01)
*C09K 8/528* (2006.01)
*C09K 8/532* (2006.01)

(52) U.S. Cl.
CPC .............. *C09K 8/532* (2013.01); *C09K 8/528* (2013.01); *E21B 37/06* (2013.01)

(58) Field of Classification Search
CPC ................................ E21B 37/06; C09K 8/528
See application file for complete search history.

(56) References Cited

U.S. PATENT DOCUMENTS 3,793,209 A 2/1974 Thompson
4,381,950 A 5/1983 Lawson
(Continued)

FOREIGN PATENT DOCUMENTS

GB 2 314 865 A 1/1998
WO WO 2007/109798 A1 9/2007
(Continued)

OTHER PUBLICATIONS

"Chelates Product Guide", Dissolvine Master of Elements, Akzonobel, Sep. 2010, 13 pages.
(Continued)

*Primary Examiner* — Catherine Loikith
(74) *Attorney, Agent, or Firm* — Oblon, McClelland, Maier & Neustadt, L.L.P.

(57) ABSTRACT

A method of removing an iron sulfide scale from a surface in fluid communication with a wellbore and/or subterranean formation comprising contacting the iron sulfide scale on the surface with a composition to dissolve the iron sulfide scale in the composition. The composition comprises (a) at least one chelating agent selected from the group consisting of DTPA, EDTA HEDTA, GLDA, CDTA, and MGDA, and salts thereof, and (b) at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl). In the composition, the weight ratio of (a):(b) lies in the range 7-60:2-20.

12 Claims, 4 Drawing Sheets

(56) References Cited

U.S. PATENT DOCUMENTS

| | | | |
|---|---|---|---|
| 4,574,050 | A | 3/1986 | Crowe et al. |
| 6,006,831 | A | 12/1999 | Schlemmer et al. |
| 7,992,656 | B2 | 8/2011 | Dusterhoft et al. |
| 8,163,675 | B2 | 4/2012 | Navarrete et al. |
| 8,673,834 | B2 | 3/2014 | Trahan |
| 2009/0242461 | A1 | 10/2009 | Eldin et al. |
| 2012/0329930 | A1 | 12/2012 | Stark et al. |
| 2014/0166282 | A1 | 6/2014 | Martinez et al. |

FOREIGN PATENT DOCUMENTS

| | | |
|---|---|---|
| WO | WO 2009/120419 A1 | 10/2009 |
| WO | WO 2014/160643 A1 | 10/2014 |

OTHER PUBLICATIONS

H.A. Nasr-El-Din, et al., "Iron Sulfide Scale: Formation, Removal and Prevention", International Symposium on Oilfield Scale, 2001, 2 pages (Abstract only).

H.A. Nasr-El-Din, et al., "Iron Sulfide Formation in Water Supply Wells With Gas Lift", SPE International Symposium on Oilfield Chemistry, 2001, 2 pages (Abstract only).

METHOD FOR REMOVING IRON SULFIDE SCALE FROM OIL WELL EQUIPMENT

CROSS-REFERENCE TO RELATED APPLICATIONS

The present application is a Continuation of Ser. No. 14/993,563, now allowed, having a filing date of Jan. 2, 2016.

BACKGROUND OF THE INVENTION

Technical Field

The present disclosure relates to methods of removing on sulfide scale deposits from surfaces in fluid communication with a wellbore and/or subterranean formation, and more particularly to methods for removing such deposits with a composition comprising at least one chelating agent and at least one converting agent.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

During the production stage of a wellbore, fluids (e.g., gas, oily steam, hot water, etc.) are generally produced from the wellbore, and scale can develop in the wellbore, subterranean formation and/or on equipment associated with the wellbore, such as downhole equipment (e.g., casings, production tubing, mandrels, pipes, pumps, etc.) and surface equipment (e.g., pumps, heating turbines, heat exchangers, etc.). Whenever the wellbore produces water, or when water injection is used to enhance the recovery of the natural resource, there is the possibility that scale will form. One type of scale includes iron sulfide compounds, which have a physical appearance of amorphous solid particles capable of absorbing water and oil.

Hydrogen sulfide, $H_2S$, is a naturally occurring contaminant of fluids that is encountered in many industries, including the oil and gas industry and the paper industry. The corrosive nature of $H_2S$ causes accumulation of particulate iron sulfide. Iron sulfide becomes entrained in hydrocarbons, glycol, salts, and the like to form scale deposits on the surfaces of conduits such as pipelines. Such deposits present a significant problem because the deposits hinder accurate determinations of pipeline structural integrity and the pipelines must be cleaned physically.

Given the various chemical and physical conditions that go into the forming of iron sulfide scales, several forms can be found in a given section of a wellbore and a pipeline. It is seldom that a single type of iron sulfide scale exists; but more generally it is a mixture of iron sulfide scales, including pyrrhotite ($Fe_7S_8$), troilite (FeS), marcasite ($FeS_2$), pyrite ($FeS_2$), greigite ($Fe_2S_4$, and mackinawite $Fe_9S_8$).

The iron sulfide particles can adhere to the internal surfaces of a wellbore, pipeline networks, and associated process equipment. The physical characteristic of the iron sulfide scale deposits can vary from a viscous, oil coated mass to a dry black powder form. The buildup of iron sulfide scale deposits over time can lead to a range of operational problems at a wellbore's completion and production stages, from inhibiting the performance of downhole tools to inducing formation damage and plugging of associated equipment, whether such equipment is located downhole or at the surface of the wellbore. The iron sulfide scale deposits may block flow of the natural resources by clogging perforations or forming a thick lining in the production tubing. The iron sulfide scale deposits can also coat and damage wellbore equipment, such as heating turbines, heat exchangers, safety valves, casings, production tubing, mandrels, pipes, separators, pumps, etc. If the iron sulfide scale deposits are not removed, the wellbore production capacity can diminish drastically, and in some cases the iron sulfide scale deposits can cause the wellbore production to be shut down for a period of time. Additionally, the iron sulfide scale deposits can lead to increased corrosion rates within pipeline networks and interference in the safe operation of pipeline valving systems, potentially leading to catastrophic system failures. As a result, in the oil industry, the iron sulfide scale deposits are a major source of economic loss. The deposits obstruct the flow of oil in wells, in the adjacent strata and in pipelines as well as in processing and refinery plants. Further, such deposits tend to stabilize oil-water emulsions that tend to form during secondary oil recovery.

Methods have been developed to decrease and remove iron sulfide scale deposits, including batch chemical cleaning, continuous chemical cleaning, and mechanical efforts, such as milling, high pressure water jetting, and sand blasting. The use of a strong acid, such as 10-20 wt % HCl, is the simplest way to dissolve iron sulfide scales, however, it is ineffective in dissolving the pyrite ($FeS_2$) and marcasite ($FeS_2$) forms of the iron sulfide scales. Additionally, using a strong acid generates large volumes of highly toxic $H_2S$ gas, which is an undesirable by-product. The strong acid can also have corrosive effects on the wellbore equipment and may damage the formation. Using an oxidizing agent may avoid such toxicity hazards but produces oxidation products, including elemental sulphur which is corrosive to pipes. Another agent for treating such deposits is acrolein, but it also has health, safety and environmental problems. Mechanical methods, such as milling and water jetting using pressures in excess of 140 MPa (with and without abrasives), generally require that each pipe or piece of equipment be treated individually with significant levels of manual intervention, which is both time consuming and expensive, but sometimes also fail to thoroughly remove the iron sulfide scale deposits.

Therefore, there is an urgent need for an iron sulfide removal composition and method which is effective and efficient for all forms of iron sulfide scales, particularly the pyrite and marcasite forms that are insoluble in strong acid, non-corrosive to the equipment, and low cost, and which does not cause damage to the formation and the environment.

BRIEF SUMMARY OF THE INVENTION

According to a first aspect, the present disclosure relates to a method of removing an iron sulfide scale from a surface in fluid communication with a wellbore and/or subterranean formation. The method comprises contacting the iron sulfide scale on the surface in fluid communication with the wellbore and/or subterranean formation with a composition to dissolve the iron sulfide scale in the composition. The composition includes (a) at least one chelating agent selected from the group consisting of DTPA, EDTA, HEDTA, GLDA, CDTA, and MGDA, and salts thereof, and (b) at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl). In the composition, the weight ratio of (a):(b) lies, in the range 7-60:2-20.

In one or more embodiments, the method further comprises acidifying the composition containing the dissolved iron sulfide scale to form a precipitant of the at least one chelating agent and a precipitant of at least one insoluble iron salt, isolating the precipitant of the at least one chelating agent and the precipitant of at least one insoluble iron salt from the composition, selectively dissolving the precipitated at least one chelating agent in another composition, and removing the precipitated at least one insoluble iron salt from the another composition.

In one or more embodiments, the composition comprises (a) at least one chelating agent selected from the group consisting of DTPA, EDTA, HEDTA, and CDTA, and salts thereof, and the composition has a pH ranging from about 8 to 14.

In one or more embodiments, the iron sulfide scale is at least one selected from the group consisting of a scale of pyrrhotite ($Fe_7S_8$), a scale of troilite (FeS), a scale of marcasite ($FeS_2$), a scale pyrite ($FeS_2$), a scale of greigite ($Fe_2S_4$), and a scale of marcasite ($Fe_9S_8$).

In one or more embodiments, at least about 70% of the iron sulfide scale is removed from the surface in fluid communication with the wellbore and/or subterranean formation. In some embodiments, at least 50 ml of the composition is used per gram of the iron sulfide scale.

In one or more embodiments, the wellbore has a bottom hole temperature in the range of from about 100° F. to about 400° F.

In one or more embodiments, the contacting lasts at least about 24 hours. In some embodiments, at least 50 ml of the composition is used per gram of the iron sulfide scale.

In one or more embodiments, the composition further comprises at least one surfactant.

In one or more embodiments, (a) and (b) of the composition are dissolved in an aqueous solution as a continuous phase, and the composition further comprises (c) a liquid aromatic solvent as a dispersed phase for solid or semisolid organic materials and (d) an effective amount of at least one emulsifier to form an emulsion. In some embodiments, the liquid aromatic solvent comprises at least one selected from the group consisting of toluene, benzene, and xylene. In some embodiments, the at least one emulsifier comprises at least one selected from the group consisting of a polyamide emulsifier having the formula $R^3O-C(O)-R^4-C(O)-N(R^1)-(CH_2)_n-NH-C(O)-R^2$ (where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl/alkene group, and n is an integer of from 2-5), a phosphate ester of an ethoxylated straight chain alcohol containing 8 to 10 carbon atoms and containing ethylene oxide in reacted form at a 4:1 or greater molar ratio relative to the straight chain alcohol, and a phosphate ester of an ethoxylated tridecyl alcohol containing ethylene oxide in reacted form at a 6:1 or greater molar ratio relative to the tridecyl alcohol. In some embodiments, the volume proportion of the aqueous solution as the continuous phase to the liquid aromatic solvent as the dispersed phase ranges from about 80:20 to about 50:50.

In one or more embodiments, the wellbore is present in at least one of an oil well, a gas well, a production well, an injection well, a naturally flowing well, an artificially lifted well, a high temperature well, a steam assisted gravity drainage well, a steam injector well, and a geothermal well.

In one or more embodiments, the surface in fluid communication with the wellbore and/or subterranean formation comprises a surface of an oil and/or gas reservoir, a geological surface, and/or a surface of at least one piece of equipment selected from the group consisting, of heating turbines, heat exchangers, safety valves, casings, production tubing, mandrels, pipes, separators, pumps, tubulars, vessels, completion equipment, screens, and downhole tools.

According to a second aspect, the present disclosure relates to a preferred method of removing an iron sulfide scale from a surface in fluid communication with a wellbore and/or subterranean formation. The method comprises contacting the iron sulfide scale on the surface in fluid communication with the wellbore and/or subterranean formation with a composition to dissolve the iron sulfide scale in the composition. The iron sulfide scale is at least one selected from the group consisting of a scale of pyrrhotite ($Fe_7S_8$), of a scale of troilite (FeS), a scale of marcasite ($FeS_2$), a scale of pyrite ($FeS_2$), a scale of greigite ($Fe_2S_4$), and a scale of mackinawite ($Fe_9S_8$). The composition includes (a) DTPA and/or salts thereof, and (b) potassium carbonate ($K_2CO_3$). In the composition, the weight ratio of (a):(b) lies in the range 7-60:2-20, and the pH of the composition is about 11-14.

In one or more embodiments, the method further comprises treating the composition containing the dissolved iron sulfide scale with an effective amount of at least one iron reducing agent to reduce $Fe^{3+}$ to $Fe^{2+}$, acidifying the composition containing the dissolved iron sulfide scale to form a precipitant of DTPA and/or a precipitant of least one insoluble iron salt, isolating the precipitated DTPA and/or the precipitated at least one insoluble iron salt from the composition, selectively dissolving the precipitated DTPA in another composition, and/or removing the precipitated at least one insoluble iron salt from the another composition.

In one or more embodiments, the method further comprises sonicating the composition which forms a liquid phase in contact with the iron sulfide scale at a frequency of about 1-20 kHz and at a power of about 1-100 kW for a duration effective to remove or reduce the iron sulfide scale.

In one or more embodiments, the composition further comprises (c) at least one formate salt selected from the group consisting of potassium formate and cesium formate. In the composition, the weight ratio of (a):(b):(c) lies in the range 7-60:2-20:2-20.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
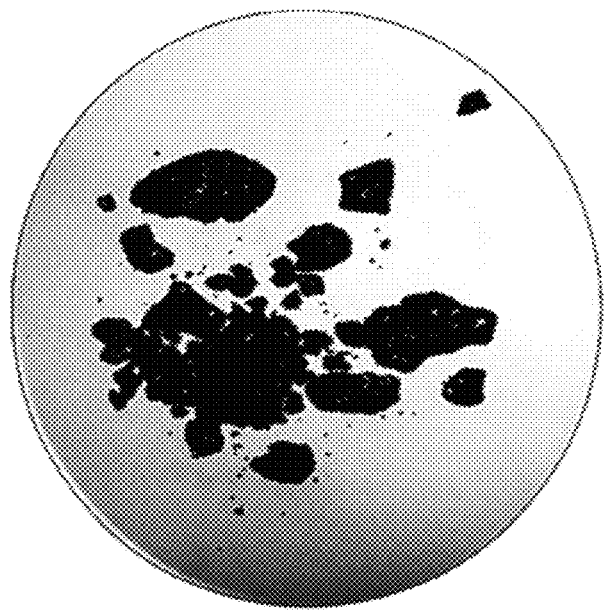
FIG. 1 is picture showing the mixture of the pyrite scale particles and the removing compositions in a flask at the beginning of the soaking treatment according to Example 1.

Disclosed herein are methods for removing an iron sulfide scale from a surface n fluid communication with a wellbore and/or subterranean formation.

According to the first aspect of the present disclosure, the method comprises contacting the iron sulfide scale on the surface in fluid communication with the wellbore and/or subterranean formation with a composition to dissolve the iron sulfide scale in the composition. The composition comprises (a) at least one chelating agent selected from the group consisting of DTPA, EDTA, HEDTA, GLDA, CDTA, and MGDA, and salts thereof, and (b) at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl). In some embodiments, the at least one converting agent may also include a bicarbonate, for example, potassium bicarbonate ($KHCO_3$).

The at least one chelating agent in the composition has a molecular structure capable of enveloping and/or sequestering a certain type of ion, including iron cations, in a stable and soluble complex. The at least one converting agent in the composition assists in the dissolution of the iron sulfide scale by converting an extremely insoluble iron sulfide salt, e.g. $FeS_2$ and $Fe_7S_8$, to a more soluble salt, and/or increases the efficiency of sequestration of the scaling cations.

In some embodiments, the iron sulfide scale that can be removed by the method includes a scale of pyrrhotite ($Fe_7S_8$), a scale of troilite (FeS), a scale of marcasite ($FeS_2$), a scale of pyrite ($FeS_2$), a scale of greigite ($Fe_2S_4$), a scale of mackinawite ($Fe_9S_8$), and a combination thereof.

The disclosed method can remove at least a portion of an iron sulfide scale from a surface in fluid communication with a wellbore and/or subterranean formation. The surface includes a natural surface (e.g., geological surface, surface of an oil and/or gas reservoir), or a surface of artificially placed or deliberately introduced materials e.g., (wellbore equipment), whose surface is also prone to scale deposition, or a surface in a subterranean formation, although the removal of scale from other surfaces of the type disclosed herein is also contemplated. In an embodiment, the method may be used for the removal of a iron sulfide scale deposits/accumulations or scale from a surface of the wellbore and/or subterranean formation. In some embodiments, the method may be used for the removal of an iron sulfide scale from the wellbore equipment (e.g., downhole equipment, surface equipment associated with the wellbore) surfaces that are in fluid communication with the wellbore and/or subterranean formation such that fluids (e.g., produced fluids) travelling to and/or from the wellbore and/or subterranean formation contact said surfaces. Non-limiting examples of wellbore equipment that might accumulate iron sulfide scale on one or more surfaces include heating turbines, heat exchangers, safety valves, casings, production tubing, mandrels, pipes, separators, pumps, tubulars, vessels, completion equipment (e.g., screens, etc.), downhole tools and any other piece of equipment that might come in contact with a wellbore fluid, whether such fluid is produced or part of a servicing fluid. In other embodiments, the method may be used for the removal of an iron sulfide scale from any surface that might come in contact with a produced natural resource (e.g., water, steam, hot water, oil, gas, etc.).

In some embodiments, the at least one chelating agent of the composition is selected from the group consisting of $K_5$-DTPA, $K_4$-EDTA, $K_3$-HEDTA, $K_4$-GLDA, $K_4$-CDTA, $K_3$-MGDA, $Na_5$-DTPA, $Na_4$-EDTA, $Na_3$-HEDTA, $Na_4$-GLDA, $Na_4$-CDTA, and $Na_3$-MGDA. Further, the at least one chelating agent may be a mixed salt chelating agent, for instance, $Na_2K_2$-EDTA, etc.

Among the chelating agents suitable for the composition are polydentate chelators, such as DTPA, EDTA, and CDTA. Polydentate chelators form multiple bonds with metal ions, including iron cations, in complexing with the metal. For example, DIM is octadentate, however, it usually forms less than eight bonds with transition metals that include iron, EDTA is hexadenate, forming a total of six bonds with $Fe^{3+}$. Besides DTPA, EDTA, HEDTA, GLDA, CDTA, and MGDA, and salts thereof, other chelating agents may also be suitable for the composition. In particular, the selection of the chelating agents may be related to the specificity of the chelating agents to the iron cations, the log K value (where K is the stability constant indicating the strength of the complex formed between the metal ion and the chelating agent), the optimum pH of the composition when used to dissolve the iron sulfide scale, and the commercial availability of the chelating agents. The higher the log K value, the more tightly the metal ion is bound to the chelating agent and the more likely that the complex will be formed. For example, based on the log K values, PDTA (1,3-propylenediaminetetraacetic acid) may be another suitable chelating agent for the composition, since its log K values for $Fe^{2+}$ and $Fe^{3+}$ are higher than the corresponding log K values HEDTA and GLDA.

In some embodiments, the concentration of the at least one chelating agent is about 7-60%, preferably about 10-40%, more preferably about 10-30%, or more preferably about 15-25%, of the total weight of the composition.

In some embodiments, the concentration of the at least one converting agent is about 2-20%, preferably about 3-18%, more preferably about 4-15%, or more preferably about 5-9%, of the total weight of the composition.

In some embodiments, the composition comprises at least one chelating agent selected from DTPA, EDTA, HEDTA, GLDA, CDTA, and MGDA, and salts thereof, and potassium carbonate ($K_2CO_3$) as the converting agent. In other embodiments, the composition comprises the at least one chelating agent and a combination of the converting agents which preferably includes potassium carbonate, such as a combination of potassium carbonate and potassium formate (and/or cesium formate), a combination of potassium carbonate, potassium formate (and/or cesium formate) and potassium hydroxide, and a combination of potassium orate and potassium chloride (and/or cesium chloride). The use of carbonate converting agent may have a beneficial effect on the amount of the iron sulfide scale which can be removed with a given volume of the composition particularly where the iron sulfide scale exists in a particular form and downhole conditions of carbon dioxide partial pressure and/or organic acids provide acid conditions for produced water which allows converted, non-chelated iron sulfide scale to be removed after the well has been returned to flowing conditions.

In some embodiments, the composition has a weight ratio of (a):(b)) in the range 7-60:2-20, preferably 10-40:3-18, preferably 10-30:4-15, or more preferably 15-25:5-9.

In some embodiments, the composition comprises (a) at least one chelating agent selected from the group consisting of DTPA, EDTA, HEDTA, and CDTA, and salts thereof, and the composition has a pH ranging from about 8 to 14, preferably from about 10 to 12, or more preferably from about 11 to 14.

In other embodiments, the composition comprises (a) at least one chanting agent selected from the group consisting of GLDA and MGDA, and salts thereof, and the composition has a pH ranging from about 2 to 6, preferably from about 3 to 5, or more preferably from about 3 to 4.

In some embodiments, a high power ultrasound, low or high frequency sonic energy, or a low power ultrasound may be used in conjunction with the disclosed method to increase the rate of dissolution of the iron sulfide scale by the composition disclosed herein. The ultrasound treatment increases surface agitation and the contact of the composition in pores within the iron sulfide scale by creating a pressure wave which forces the composition in and out of the scale and prevents the composition from becoming saturated in the low mixing potential areas. In one embodiment, a low power (e.g. 1-2 kW) and frequency (e.g. 1-2 kHz) ultrasound can be delivered via a piezoelectric or magnetostrictive transducer inserted directly into a well in the vicinity of iron sulfide deposits. The well may be flooded with the composition or other fluids containing the components of the composition. In another embodiment, a relatively high frequency (e.g. 20 kHz or higher) and/or high power (e.g., 10-100 kW or greater) ultrasound can be delivered via a well sonication device, such as a QVI siren available from Quantum Vortex, Inc. (State College, Pa., USA). In one embodiment, the sonication device is small enough to fit standard wellbore casings (5" or 7.5" wellbore casings) and be employed to sonicate the entire well or a particular section of the well. In another embodiment, the sonication device is located outside a well and produces a high ultrasonic power sufficient to overcome attenuation en route from the well head to the target zone having iron sulfide scale deposits. The well may likewise be flooded with the composition or other fluids containing the components of the composition to establish a continuous liquid phase for efficient ultrasonic operation. The duration of the sonication can be short, e.g. tens of hours, or continuously.

The method of the present disclosure can be implemented in numerous different ways and environments. In one embodiment, the method is implemented by introducing the composition to the wellbore and/or surrounding formation. In some embodiments, the composition is applied to the wellbore and/or surrounding formation simultaneously with drilling fluids or muds, spacer fluids, lost circulation fluids, washing fluids, sweeping fluids, fracturing fluids, acidizing fluids, completion fluids, filter cake removal fluids, or cement slurries. In other embodiments, the composition is incorporated in the above mentioned fluids or slurries. In other embodiments, the composition is applied independently of the above mentioned fluids or slurries.

In a well drilling operation, a pumping system may be used to introduce and circulate the composition or a fluid containing the components of the composition down the drill string of the well to remove iron sulfide scale and/or prevent iron sulfide scale information. The composition or the fluid then exits through the rotating drill bit and flows back to the surface via the annular space formed between the borehole wall and the drill string. In this situation, the composition or the fluid may also (a) provide support to the borehole wall and (b) prevent or, in case of under balanced drilling (UBD), control formation fluids or gasses from entering the well, with the pressure the composition or the fluid exerts against the wellbore inside wall that is mainly built-up of a hydrostatic part, related to the weight of the composition/fluid column, and a dynamic part related to frictional pressure losses caused by, for instance, the composition/fluid circulation rate or movement of the drill string. In one embodiment, the composition or the fluid containing the components of the composition is pumped into the wellbore at such a rate or pressure that the pressure of the composition or the fluid against the wellbore inside wall, termed the "fluid pressure" herein, does not exceed the formation fracture pressure or formation strength, whether the composition or the fluid is static or circulated during filling operations. If the formation strength is exceeded, formation fractures will occur which will create drilling problems such as fluid losses and borehole instability. On the other hand, in overbalanced drilling, the pressure in the well is always maintained above the pore pressure to avoid formation fluids entering the well, while during under balanced drilling, the fluid pressure in the well is maintained just below the pore pressure to controllably allow formation fluids entering the well. In some embodiments, the injection pressure for the composition or the fluid containing the components of the composition ranges from about 5,000 psi to 15,000 psi. In some embodiments, an injection pressure of about 5,000-15,000 psi or a different range is maintained to keep the fluid pressure slightly below or above the pore pressure but not exceeding the formation strength. In other embodiments, when the composition or the fluid containing the components of the composition is continuously circulating, or alternately circulating and statically soaking with the iron sulfide scale, the circulation rate, which affect fluid pressure, may also be adjusted along with the injection pressure to keep the fluid pressure slightly below or above the pore pressure but not exceeding the formation strength.

In one embodiment, the components of the composition are combined at the well site; alternatively, the components of the composition are combined off-site and are transported to and used at the well site. The resulting composition may be pumped downhole where it may function as intended (e.g., remove at least a portion of an iron sulfide scale deposit on a surface in fluid communication with the wellbore and/or subterranean formation).

In one embodiment, the method may be used for the removal of an iron sulfide scale in any suitable stage of a wellbore's life, such as for example, during a drilling operation, completion operation, production stage, etc. In some embodiments, the disclosed method may be used for removing iron sulfide scale deposits from any surfaces in fluid communication with the wellbore by placing the composition downhole and contacting the composition with the iron sulfide scale to remove all or a portion thereof, concurrent with and/or subsequent to drilling operations where iron sulfide scales are formed on those surfaces. In other embodiments, concurrent with and/or subsequent to drilling operations where scale is formed and/or likely to be formed on a downhole surface, the composition of the disclosed method (or components thereof) may be combined with an aqueous based drilling fluid to prevent/reduce the formation of scale and/or remove all or a portion of existing iron sulfide scale.

In some embodiments, the disclosed method may be utilized in conjunction with a formation evaluation operation such as electronically logging the wellbore. For example, in one embodiment, the wellbore may be evaluated via electronic logging techniques following sufficient contact between the iron sulfide scale and the composition to remove all or a portion of the iron sulfide scale. In such an embodiment, a method of evaluating a formation utilizing the composition of the disclosed method may generally comprise circulating a drilling fluid during a drilling operation (wherein an iron sulfide scale is formed during the drilling) and, upon the cessation of drilling operations and/or upon reaching a desired depth, removing the iron sulfide scale deposits from a downhole surface (e.g., a wellbore surface, formation surface, equipment surface, etc.) utilizing the composition of the disclosed method. Upon sufficient removal of the iron sulfide scale deposits logging tools may be run into the wellbore to a sufficient depth to characterize a desired portion of the subterranean formation penetrated by the wellbore.

In another embodiment, when desired (for example, upon the cessation of drilling operations and/or upon reaching a desired depth), the wellbore or a portion thereof may be prepared for completion. In completing the wellbore, it may be desirable to remove all or a substantial portion of the iron sulfide scale from any surfaces where the scale might have been deposited, from equipment surface to formation surface.

In another embodiment, the disclosed method may comprise completing the wellbore. In such an embodiment, the wellbore a portion thereof, may be completed by providing a casing string within the wellbore and cementing or otherwise securing the casing string within the wellbore. In such an embodiment, the casing string may be positioned (e.g., lowered) into the wellbore to a desired depth prior to, concurrent with, or following provision of the composition and/or removal of the iron sulfide scale deposit. When the iron sulfide scale has been sufficiently degraded and/or removed from the downhole surface (e.g., wellbore surface, equipment/casing surface, formation surface, etc.), the composition may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set.

In another embodiment, the disclosed method may be utilized during the production stage of a wellbore. When the wellbore reaches the production stage, whenever water is produced as the natural resource (e.g., steam, hot water, etc.) or along with the natural resource e.g., oil), iron sulfide scale may deposit on any of the surfaces that the produced water comes in contact with (e.g., formation surface, production tubing, etc.). The presence of the iron sulfide scale may slow down or completely stop production of the natural resource oil, water, steam, etc.), so it may be advantageous to perform another operation of iron sulfide scale removal. Accordingly, the composition of the disclosed method may be placed downhole in association with a production enhancement operation or service, where the composition is contacted with a downhole surface (e.g., formation surface, wellbore surface, equipment surface, etc.) in fluid communication with the wellbore and/or subterranean formation to remove all or a portion of scale therefrom and thereby increase the rate of production of resources from the well.

In some embodiments, the disclosed method may be used to prevent iron sulfide scale formation on various surfaces in fluid communication with a wellbore and/or subterranean formation, because of the ability of the composition to chelate dissolved metal ions, including the iron cations, present in the wellbore environment. In other embodiments, the disclosed method may be advantageously used to lower the risk of formation damage due to the ability of the composition to effectively chelate $Fe^{3+}$ ions, for example.

In one embodiment, the disclosed method may be advantageously used for iron sulfide scale removal operations in any suitable type of subterranean formation. Non-limiting examples of formations suitable for this disclosure include sandstone, carbonate-containing formations, shale, or combinations thereof.

In one embodiment, the disclosed method may be advantageously used for iron sulfide scale removal operations in any suitable type of wellbore. Non-limiting examples of wellbores suitable for this disclosure include those in an oil well, a gas well, a production well, an injection well, a naturally flowing well, an artificially lifted well, a high temperature well, a steam assisted gravity drainage well, a steam injector well, and a geothermal well.

In one embodiment, the composition of the disclosed method may be placed downhole and allowed to circulate, for example, through the production tubing, through the surface equipment (e.g., heating turbines, heat exchangers) associated with the wellbore; or in any other suitable way to contact with the iron sulfide scale present on a surface in fluid communication with a wellbore and/or subterranean formation, to remove all or a portion of the scale therefrom and thereby increase the rate of production of resources from the well. In another embodiment, the composition may be injected directly on the surface where the iron sulfide scale has been deposited. In another embodiment, the composition may be allowed to remain in contact with the iron sulfide scale for a sufficient period of time, i.e. a soak-period, such that the composition removes all or a substantial portion of the scale from a surface where the scale may have been deposited.

The iron sulfide scale removal efficiency of the method is affected by several factors, including the particular chelating agents and converting agents used, the presence or absence of additives such as surfactants, the concentration and/or amount of the chelating agents and converting agents in the composition, the volume of the composition used, the composition of the iron sulfide scale, the thickness of the iron sulfide scale, the temperature of the operational environment (e.g. the wellbore), the composition of the formation, the pressure of the formation, the diameter of the hole, the contact time of the composition with the iron sulfide scale, or combinations thereof. For example, with the same well size and iron sulfide scale composition, the thicker the iron sulfide scale, the larger the amount and/or volume of the composition will be needed to dissolve the iron sulfide scale downhole, with the maximum volume of the composition being limited by the volume of the well. Thus, the effect of iron sulfide scale thickness becomes more significant in a relatively small-sized well, since the ratio of the iron sulfide scale mass to the composition volume may more likely exceed the maximum solubility of the iron sulfide scale in the composition.

In some embodiments, the method removes at least about 70%, or preferably at least about 80%, or more preferably at least about 90%, even more preferably at least 95%, yet preferably at least 99%, of the iron sulfide scale from the surface in fluid communication with the wellbore and/or subterranean formation.

In some embodiments, the ratio of the composition volume used to contact the mass of the iron sulfide scale is at least about 30 ml/g, prefer at least about 50 ml/g, preferably at least about 75 ml/g, or preferably about at least 100 ml/g.

Various combinations of the chelating agents and converting agents in the composition of the disclosed method may be operable under different suitable temperature ranges. As such, one or more of the chelating agents in combination with one or more of the converting agents may be selected for inclusion in the composition such that the composition exhibits a user and/or process-desired operable temperature range (e.g., an ambient downhole temperature or bottom hole temperature for a given wellbore). In some embodiments, the composition may exhibit an operable temperature range of from about 65° F. to about 400° F., alternatively from about 72° F. to about 385° F., or alternatively from about 88° F. to about 365° F.

In some embodiments, the disclosed method may be used for iron sulfide scale removal in wellbores having bottom hole temperatures (BHTs) in the range of from about 100° F. to about 400° F., alternatively from about 200° F., to about 380° F., or alternatively from about 250° F. to about 380° F.

In some embodiments, the method may be used for iron sulfide scale removal in ambient or relatively low temperature/ambient or relatively low pressure wellbores having (i) a BHT no greater than 100° F., or alternatively no greater than 200° F., or alternatively no greater than 300° F., and (ii) a borehole pressure no greater than about 20 psi, or alternatively no greater than about 100 psi, or alternatively, no greater than about 200 psi, alternatively no greater than about 400 psi, alternatively no greater than about 1000 psi, alternatively no greater than about 3000 psi, alternatively no greater than about 5000 psi, or alternatively no greater than about 10,000 psi.

In some embodiments, the method may be used for iron sulfide scale removal in high temperature/high pressure wellbores having (i) a BHT greater than about 300° F., alternatively greater than about 325° F., or alternatively greater than about 350° F.; and (ii) to borehole pressure greater than about 10,000 psi, alternatively greater than about 12,500 psi, or alternatively greater than about 15,000 psi.

In other embodiments, the method may be used for iron sulfide scale removal in extreme high temperature/high pressure wellbores having (i) a BHT greater than about 350° F., alternatively greater than about 375° F., or alternatively greater than about 400° F.; and (ii) a borehole pressure greater than about 15,000 psi, alternatively greater than about 17,500 psi, or alternatively greater than about 20,000 psi.

In one embodiment, a sufficient amount and/or volume of the composition that has been placed in contact with the iron sulfide scale may be allowed to remain in contact with the iron sulfide scale for a sufficient period of time such that the composition will remove all or a substantial portion of the iron sulfide scale from any surfaces where the iron sulfide scale might have been deposited. In some embodiments, the composition may be allowed to remain in contact with the iron sulfide scale for a soak-period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, or alternatively at least about 100 hours. In one embodiment, during such a "soak period," the composition or a fluid containing the components of the composition within the wellbore and/or associated wellbore equipment may remain in a substantially static state, for example, as opposed to a dynamic state in which circulation may be present. In one embodiment, the wellbore may be shut-in while the composition remains in contact with the iron sulfide scale deposits.

In one embodiment, the composition in the method further comprises at least one surfactant. The surfactant may function to improve the compatibility of the composition with other fluids (e.g., formation fluids) that may be present in the subterranean formation and/or to enhance contact of the composition with one or more scaled surfaces. In some embodiments, a surfactant may be used to enhance the reactivity of the composition by, for example, breaking any emulsions present from the drilling fluid system or improving the interfacial interactions between the iron sulfide scale deposit and the composition thereby allowing the composition to contact the scale deposit more easily. Non-limiting examples of surfactants suitable for use in the composition include ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

Commercial examples of surfactants that may be suitable for use in the present disclosure include without limitation CFS-485 casing cleaner, LOSURF-300M surfactant, LOSURF-357 surfactant LOSURF-360 surfactant, LOSURF-400 surfactant, LOSURF-2000S surfactant, LOSURF-2000M surfactant, LOSURF-259 nonemulsifier, and NEA-96M surfactant, CFS-485 casing cleaner is a blend of surfactants and alcohols, LOSURF-300M surfactant is a nonionic surfactant; LOSURF-357 surfactant is a nonionic liquid surfactant; LOSURF-360 surfactant is a nonionic surfactant; LOSURF-400 surfactant is a nonemulsifier; LOSURF-2000S surfactant is a blend of an anionic nonemulsifier and an anionic hydrotrope; LOSURF-2000M surfactant is a solid surfactant; LOSURF-259 nonemulsifier is a nonionic, nonemulsfier blend; and NEA-96M surfactant is a general surfactant and nonemulsifier; all of which are available from Halliburton Energy Services, Inc.

Surfactants suitable for use in the present disclosure are described in more detail in U.S. Pat. No. 7,992,656, which is incorporated by reference herein in its entirety. In an embodiment, the surfactants may be present in the composition in an amount sufficient to prevent incompatibility with formation fluids or wellbore fluids. In some embodiments, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the composition. In other embodiments, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. %, based on the total weight of the composition.

In some embodiments, it may be beneficial to add a surfactant to the composition as it is being pumped downhole, inter alia, to help reduce the possibility of forming emulsions with natural resources (e.g., oil) produced by the wellbore. In other embodiments, it may be beneficial to pretreat the surfaces of the iron sulfide scale deposits with a surfactant fluid before treating the surfaces with the composition (with or without the surfactants) of the disclosed method. In some embodiments, microemulsion additives optionally may be included in the composition. Non-limiting examples of emulsion-minimizing surfactants and microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSO-21E surfactant is a foaming surfactant; SSO-21MW agent is a foaming surfactant and GASPERM 1000 service is a microemulsion; all of which are commercially available from Halliburton Energy Services, Inc.

In some embodiments, other additives such as corrosion inhibitors, clay control agents, pH control agents, lubricants, iron control agents, such as erythorbic acid and stannous chloride, that reduce $Fe^{3+}$ to $Fe^{2+}$ to avoid precipitation of iron (III) compounds, and the like may be optionally included in the composition.

In many instances, the iron sulfide scales may be coated and/or commingled with solid or semisolid organic material which cannot be readily removed by the composition comprising the chelating agents and converting agents of the disclosed method. For example, in oil and gas production wells and petroleum processing equipment, iron sulfide scale deposits may be coated with various organic deposits such as oils, asphaltenes, paraffins, tars, greases, and the like. To obtain the full production capacity of wells and the like, it is advantageous to remove these deposits. In one embodiment, at least one aromatic solvent for removing the organic deposits is used prior to or subsequent to treating the iron sulfide scale deposits with the composition comprising the chelating agents and converting agents. However, these multistage treatments can be costly, time consuming and sometimes ineffective, and may require consecutive rounds of treatments.

In a preferred embodiment, the composition comprising the chelating agents and the converting agents dissolved in an aqueous solution as a continuous phase may further comprise a liquid aromatic solvent as a dispersed phase for solid or semisolid organic materials and an effective amount of at least one emulsifier to form a stable emulsion. Iron sulfide scales having occluded organic materials (e.g., coatings an or intermediate coatings) are treated with the emulsion to effectively remove both the iron sulfide scale and the organic material in a one-stage treatment. Non-limiting examples of the liquid aromatic solvent in the emulsion include toluene, both crude and refined, benzene, xylene, and the like. Non-limiting examples of the emulsifier include polyamide emulsifiers having the formula $R^3O-C(O)-R^4-C(O)-N(R^1)-(CH_2)_n-NH-C(O)-R^2$ (where $R^1$ and $R^2$ are independently selected from $C_{10}$-$C_{24}$ alkylene groups, $R^3$ is a hydrogen or $C_1$-$C_5$ alkyl group, $R^4$ is a $C_1$-$C_5$ alkyl/alkene group, and n is an integer of from 2-5) and typically used at a concentration of 0.5-1.5% of the total weight of the emulsion, as disclosed in U.S. Pat. No. 8,163,675B2, which is incorporated herein by reference in its entirety; a phosphate ester of an ethoxylated straight chain alcohol containing 8 to 10 carbon atoms and containing ethylene oxide in reacted form at a 4:1 or greater molar ratio, preferably at a 6:1 or greater molar ratio, preferably at an 8:1 or greater molar ratio, or preferably at a 10:1 or greater molar ratio, relative to the straight chain alcohol, and typically used at a concentration of 0.5-5% of the total volume of the emulsion; and a phosphate ester of an ethoxylated tridecyl alcohol containing ethylene oxide in reacted form at a 6:1 or greater molar ratio, preferably at an 8:1 or greater molar ratio, or preferably at a 10:1 or greater molar ratio, relative to the tridecyl alcohol, and typically used at a concentration of 0.5-5% of the total volume of the emulsion.

U.S. Pat. No. 6,006,831, which is incorporated herein by reference in its entirety, describes additional emulsifiers that may also be suitable for the composition of the present disclosure. They include fatty acids, soaps of fatty acids (e.g., calcium soaps), and fatty acid derivates including amidoamines, polyamides, polyamines, sulfonates, triglycerides, esters (such as sorbitan monoleate polyethoxylate, sorbitan dioleate polyethoxylate), imidazolines, alcohols and combination derivatives of the above. The fatty acid soaps can be formed in situ by the addition of the desired fatty acid and a base, preferably lime. The above emulsifiers are generally used in amounts of about 0.4-2.5 g/100 ml of the emulsion fluid.

The emulsion can be prepared having an aqueous phase to aromatic phase volume proportion ranging from about 90:10 to about 40:60, preferably from about 80:20 to about 50:50, or preferably from about 70:30 to about 60:40.

The composition of the disclosed method may be disposed of, such as by re-injection into the subterranean formation once the chelating agent(s) of the composition become saturated with iron cations from the iron sulfide scale. Because a large volume of the composition is sometimes needed to remove iron sulfide scale deposits and particularly because the costs of the chelating agent(s) in the composition may be high, it may be advantageous to reclaim and reuse the chelating agent(s) from the spent composition. Thus, in some embodiments, the method of the present disclosure may further comprise acidifying the composition containing the dissolved iron sulfide scale to form a precipitant of the at least one chelating agent and a precipitant of at least one insoluble iron salt, isolating the precipitant of the at least one chelating agent and the precipitant of at least one insoluble iron salt from the composition, selectively dissolving the precipitated at least one chelating agent in another composition, and removing the precipitated at least one insoluble iron salt from the another composition.

Specifically, following the contacting of the composition with the iron sulfide scale and saturation of the chelating agent(s) with the iron cations from the scale, the spent composition may be acidified to a pH of about 0-1. The acidification of the spent composition in precipitating the chelating agent(s) out of the spent composition may be achieved by the addition of a mineral or strong acid. In one embodiment, the acid may include at least one of hydrochloric acid, nitric acid, hydrobromic acid, hydroiodic acid, formic acid, hydrofluoric acid, sulfuric acid, and chloric acid. In another embodiment, hydrochloric acid alone is used to acidify the spent composition. In still another embodiment, sulfuric acid may be used alone or in combination with at least hydrochloric acid to acidity the spent composition.

As the pH is reduced, the availability of anions with which the sequestered cations, e.g. $Fe^{2+}$ and $Fe^{3+}$, may react may allow the cations to be released from the chelated complex to form one or more insoluble iron salts that will precipitate out of the composition. The reduction of the pH to about 0-1 may also cause the chelating agent(s) to precipitate out of the composition in its acid form. Since iron (III) compounds are generally more insoluble than iron (II) compounds even in non acidic solution, to reduce the mass of the insoluble iron salt(s) and facilitate the recovery of the chelating agent(s), prior to or concurrent with the acidification, one or more iron reducing agents, such as erythorbic acid, ascorbic acid, and stannous chloride, may be optionally added to the spent composition to reduce $Fe^{3+}$ being released from the chelated complex to $Fe^{3+}$, the salt(s) of which will more likely remain in the soluble fraction of the composition and separate from the precipitate of the chelating agent(s). According to U.S. Pat. No. 4,574,050, which is incorporated herein by reference in its entirety, erythorbic acid or ascorbic acid may be used at a concentration of 2400 mg/l to be effective. Additionally, at least one hydrogen sulfide scavenger may also be added to make the sulfide unavailable for re-formation and/or re-precipitation of ferric sulfide and ferrous sulfide. Non-limiting examples of suitable hydrogen sulfide scavengers include a reaction product of glyoxal and a polyamine disclosed in US Patent Application No. US20120329930 A1 (incorporated herein by reference in its entirety), a functionalized alpha-hydroxy alkyl ether disclosed in US Patent Application No. US20140166282 A1 (incorporated herein by reference in its entirety), and a polyaliphatic amine having the formula $H_2NRNH$—(RNH)n-H I, wherein R is an aliphatic radical and n is from about 0 to about 15, disclosed in US Patent Application No. US2009/033995 (incorporated herein by reference in its entirety), etc.

The precipitated chelating agent(s) and iron salt(s) may then be isolated from the remainder of the composition. Isolation of the precipitants may be performed by filtering the solids or decanting the solution off the solids, or siphoning, for example. Once isolated from the remainder of the composition, the solids may be introduced into another composition containing water and/or one or more of the converting agents (e.g. potassium carbonate) with a pH of about 5-7, or about 6, to selectively dissolve the precipitated chelating agent(s) while limiting the ability of the chelating agent(s) to re-chelate and dissolve the precipitated iron salt(s). Once the chelating agent(s) have become selectively redissolved, the still-precipitated iron salt(s) may be separated from the another composition by, for example, filtration, decantation, and/or siphoning for disposal.

In one embodiment, the another composition containing the redissolved chelating agent(s) may be reused to remove an iron sulfide scale. Prior to reuse of the chelating agent(s) in the another composition and following removal of the insoluble iron salt(s), in one embodiment, when the chelating agent(s) to be reused is at least one selected from the group consisting of DTPA, EDTA, HEDTA, and CDTA, and salts thereof, the pH of the another composition is raised to a pH in the range of 8-14, preferably 10-14, or more preferably 11-14. In one embodiment, the pH of the another composition is raised by adding an additional amount of the converting agent(s) (e.g. potassium carbonate and/or potassium bicarbonate) to the another composition. In another embodiment, the pH of the another composition is raised by adding an alkali hydroxide to the another composition. One of ordinary skill in the art will recognize that the amount of the converting agent(s) added will depend upon the particular converting agent(s) used and the desired pH of the another composition. In another embodiment, when the chelating agent(s) to be reused is at least one selected from the group consisting of GLDA and MGDA, and salts thereof, the pH of the another composition may be adjusted to between about 2 and about 6, preferably between about 3 and about 5, or more preferably between 3 and about 4. If small quantities of the chelating agent(s) are lost in the reclaiming process, small amounts may be added for subsequent reuse cycles so that recycling of the chelating agent(s) may be achieved without a loss in the iron sulfide scale removal efficiency in successive cycles.

A second aspect of the disclosure relates to a preferred method of removing an iron sulfide scale from a surface in fluid communication with a wellbore and/or subterranean formation. The method comprises contacting the iron sulfide scale on the surface in fluid communication with the wellbore and/or subterranean formation with a composition to dissolve the iron sulfide scale in the composition. The iron sulfide scale is at least one selected from the group consisting of a scale of pyrrhotite ($Fe_7S_8$), a scale of troilite (FeS), a scale of marcasite ($FeS^2$), a scale of pyrite ($FeS_2$) a scale of greigite ($Fe_2S_4$), and a scale of mackinawite ($Fe_9S_8$). The composition comprises (a) DTPA and/or salts thereof, and (b) potassium carbonate ($K_2CO_3$). In the composition, the weight ratio of (a):(b) lies in the range 7-60:2-20, and the pH of the composition is about 11-14.

In one embodiment, the preferred method may further comprise treating the composition containing the dissolved iron sulfide scale with an effective amount of at least one iron reducing agent to reduce $Fe^{3+}$ to $Fe^{2+}$, acidifying the composition containing the dissolved iron sulfide scale to form a precipitant of DTPA and/or a precipitant of at least one insoluble iron salt, isolating the precipitated DTPA and/or the precipitated at least one insoluble iron salt from the composition, selectively dissolving the precipitated DTPA in another composition, and/or removing the precipitated at least one insoluble in salt from the another composition. The another composition to selectively dissolve the precipitated DTPA may preferably comprise water and potassium carbonate at a pH of about 5-7, or preferably about 6, and may be raised to a pH of about 11-14 following the removal of the at least one insoluble iron salt and prior to using the another composition to remove iron sulfide scale deposits.

In some embodiments, the composition in contact with the iron sulfide scale forms a liquid phase, either on its own or in combination with other fluids. In either case, the preferred method may further comprise sonicating the liquid phase comprising the composition in contact with the iron sulfide scale at a frequency of about 1-50 kHz, of preferably about 1-30 kHz, or preferably about 1-20 kHz, and at a power of about 1-300 kW, preferably about 1-200 kW, or preferably 1-100 kW, or preferably 1-50 kW, or preferably 1-25 kW, for a duration (e.g. tens of hours or continuous) effective to remove or reduce the iron sulfide scale.

In some embodiments, the composition of the method can further comprise (c) at least one formate salt selected from the group consisting of potassium formate and cesium formate, and the weight ratio of (a):(b):(c) lies in the range 7-60:2-20:2-20. The at least one formate salt used together with potassium carbonate may increase the efficiency of iron cation chelation by the chelating agent(s) so that the effective dissolution capacity of the composition for the iron sulfide scale is increased.

Similar to the method of the first aspect of the disclosure, this preferred method can be implemented in numerous different ways and environments, and the composition of this method can have any of the additional components and combinations thereof that the composition of the method of the first aspect may include, as described herein.

Having generally described this invention, a further understanding can be obtained by reference to certain specific examples which are provided herein for purposes of illustration only and are not intended to be limiting unless otherwise specified.

Example 1

Preparation of the Iron Sulfide Scale Removing Composition and Determination of the Solubility of Pyrite ($FeS_2$) Scale Particles in the Removing Composition The iron sulfide scale removing composition was prepared by dissolving the chelating agent diethylene triamine pentaacetic acid (DTPA) and the converting agent potassium carbonate ($K_2CO_3$) in water to reach the final concentration of 0.5 M and 0.43 M, respectively, and adjusting the pH of the solution to 12-13 with a concentrated potassium hydroxide solution.

Pyrite ($FeS_2$) scale particles collected from the field were then mixed with and let soak in the above iron sulfide scale removing composition in various ratios (grams of the pyrite scale particles to milliliters of the removing composition) for 24, 48, or 72 hours at 70° C. to determine the solubility of the pyrite scale particles and the dissolution/removal efficiency of the removing composition under each condition.

Figure 2:
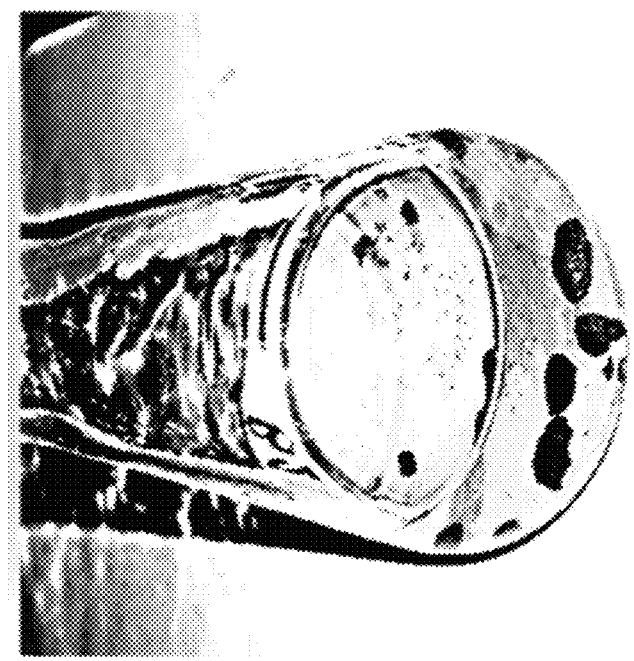
FIG. 2 is a top view of the mixture in the flask displayed in FIG. 1 according to Example 1, showing the input pyrite scale particles present in the mixture at the beginning of the soaking treatment.

FIG. 1 shows the mixture of the pyrite scale particles and the removing composition in a flask at the beginning of the soaking treatment. The aqueous removing composition had a yellowish color and was mostly clear. FIG. 2 is a top view of the mixture in the flask showing the initial quantity of the input pyrite scale particles present in the mixture at the beginning of the soaking treatment.

Figure 4:
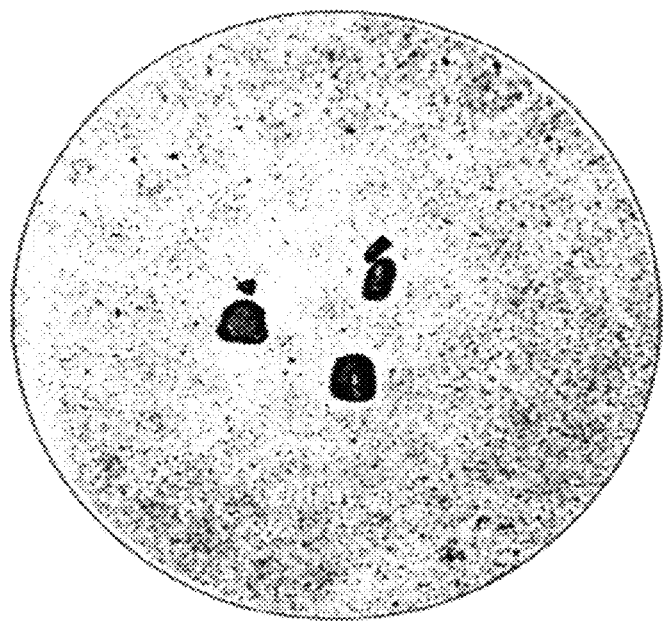
FIG. 4 is a top view of the mixture in the flask displayed in FIG. 3 according to Example 1, showing the quantity of the pyrite scale particles remaining in the mixture in the flask after 24 hours of soaking treatment as compared with the quantity of the input pyrite scale particles shown in FIG. 2.
Figure 3:
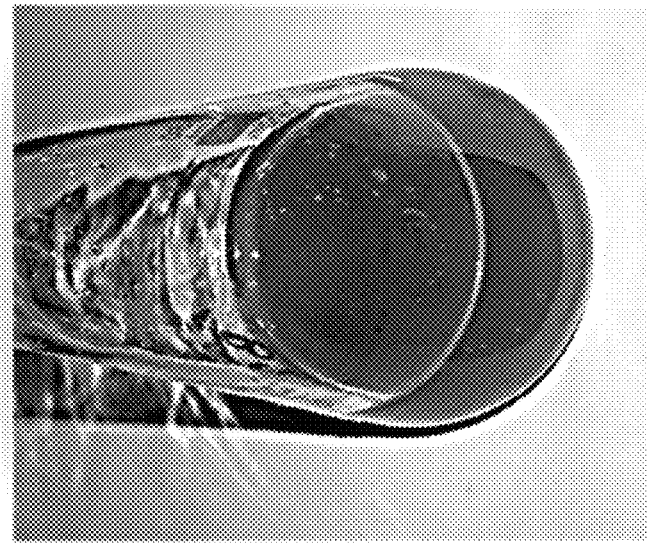
FIG. 3 is a picture showing the mixture of the pyrite scale particles and the removing composition in the flask after 24 hours of soaking treatment at 70° C. according to Example 1.

The pyrite scale particle dissolution/removal efficiency was determined based on the weight of the pyrite scale particles before and after the soaking treatment with the removing composition. The removing composition was able to dissolve/remove about 70% of the pyrite scale particles after 24 hours of soaking treatment 70° C., with the solubility being 2 grams of the pyrite scale particles per 100 ml of the removing composition. FIG. 3 shows the mixture of the pyrite scale particles and the removing composition in the flask after 24 hour of soaking treatment. The mixture had a darker color due to the dissolution of the pyrite scale particles in the removing composition. FIG. 4 is the corresponding top view of the mixture in the flask, showing the reduced quantity of the pyrite scale particles remaining in the mixture in the flask after 24 hours of soaking treatment as compared with the initial input quantity of the pyrite scale particles shown in FIG. 2.

Figure 6:
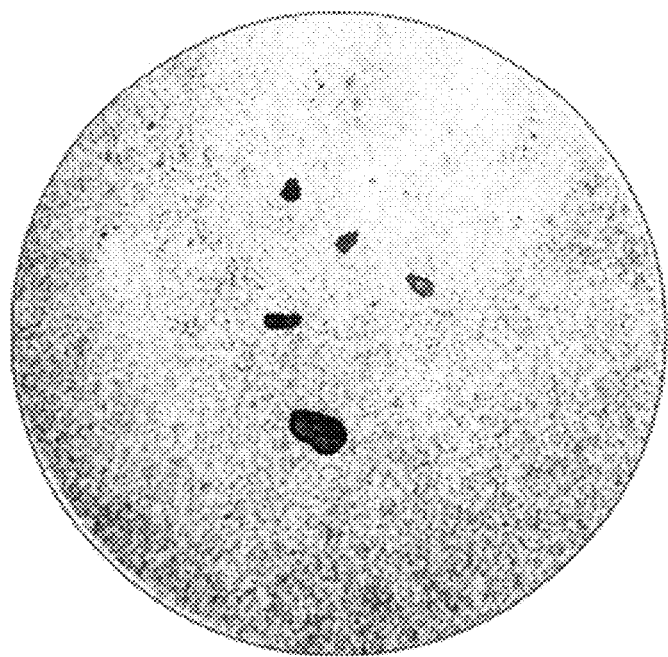
FIG. 6 is a top view of the mixture in the flask displayed in FIG. 5 according to Example 1, showing the further reduced quantity of the pyrite scale particles remaining in the mixture in the flask after 48 hours of soaking treatment as compared with the quantity of the pyrite scale particles remaining after 24 hours of soaking treatment shown in FIG. 4.
Figure 5:
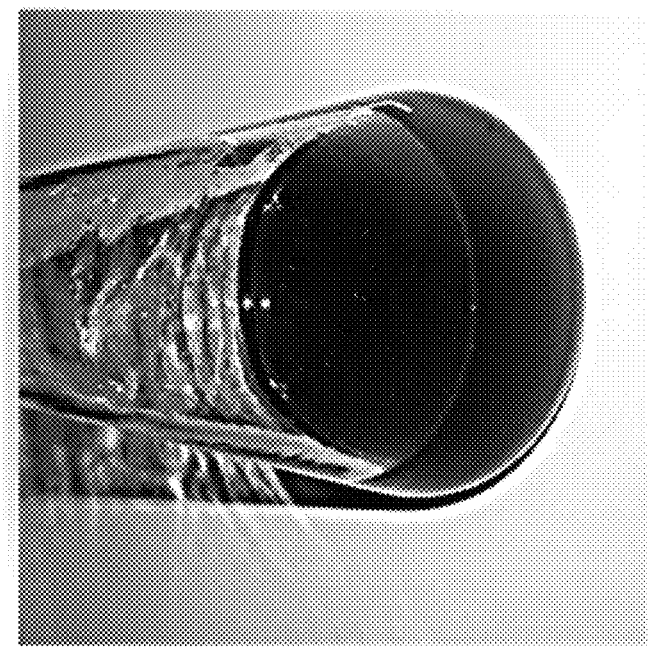
FIG. 5 is a picture showing the m the pyrite scale particles and the removing composition in the flask after 48 hours of soaking treatment at 70° C. according to Example 1.

The pyrite scale particle dissolution/removal efficiency reached about 80% after 48 hours of soaking treatment at 70° C., and reached about 90% after 72 hours of soaking treatment at 70° C. FIG. 5 shows the mixture of the pyrite scale particles and the removing composition in the flask after 48 hours of soaking treatment, and FIG. 6 is the corresponding top view of the mixture in the flask. Referring to FIG. 5, the color of the mixture following the 48-hour soaking treatment was even darker and turning black as compared with the color of the mixture following the 24-hour soaking treatment shown in FIG. 3, indicating further increased dissolution of the pyrite scale particles in the removing composition with the additional treatment time. Referring to FIG. 6, the quantity of the pyrite scale particles remaining in the mixture in the flask after 48 hours of soaking treatment was further reduced as compared with the quantity of the pyrite scale particles remaining after 24 hours of soaking treatment shown in FIG. 4, consistent with the increased dissolution of the pyrite scale particles.

Example 2

Figure 7:
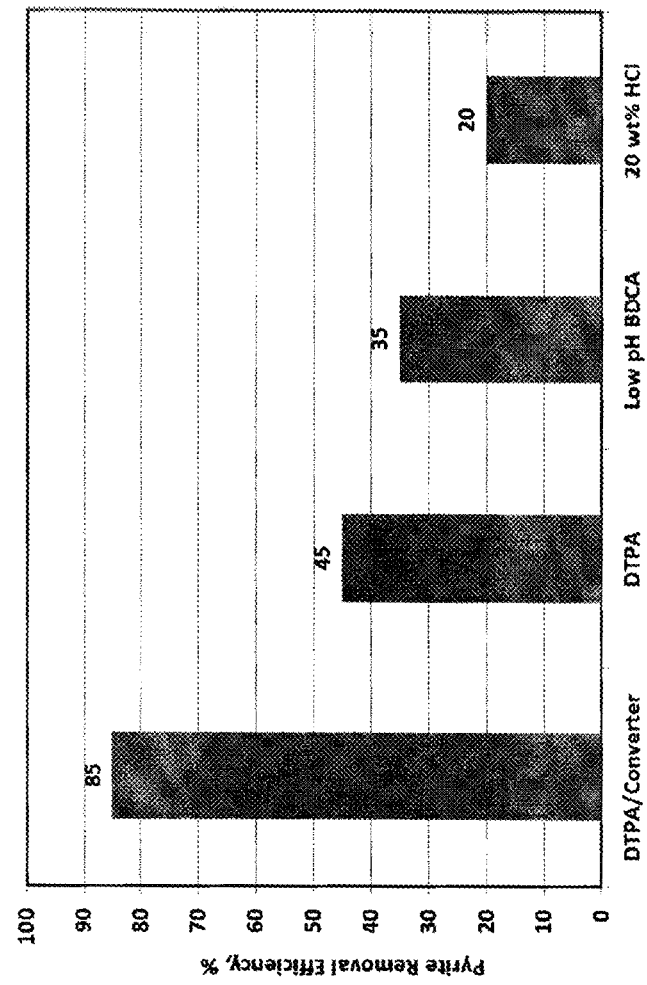
FIG. 7 is a graphical presentation of the pyrite scale removal efficiencies of the removing composition comprising DTPA and potassium carbonate (DTPA/Converter), DTPA alone, a low pH BDCA solution, and 20 wt % HCl.

Determination and Comparison of the Pyrite Scale Removal Efficiencies of the Removing Composition (DTPA/Converter), DTPA, a Low pH BDCA Solution, and 2 wt % HCl The pyrite scale removal efficiencies of 0.5 M DTPA (pH 12-13) a low pH bio-degradable chelating agent (BDCA) solution comprising 0.5 M GLDA at a pH of 3-4, and 20 wt % HCl were likewise determined in parallel with the removing composition (DTPA/Converter) following a 48-hour soaking treatment at 70° C., with the results presented in FIG. 7. The removing composition (DPTA/Converter) exhibited the highest pyrite scale removal efficiency of 85%, followed by, in descending order, 0.5 M DTPA with a 45% removal efficiency, the low pH BDCA solution with a 3.5% removal efficiency, and 20 wt % HCl with a 20% removal efficiency.

The invention claimed is:
1. A method of removing an iron sulfide scale from a surface in fluid communication with a wellbore, comprising:
    contacting the iron sulfide scale on the surface in fluid communication with the wellbore and/or subterranean formation with a composition to dissolve the iron sulfide scale in the composition, wherein the composition has a pH of from 8 to 11 and comprises:
    (a) at least one chelating agent selected from the group consisting of DTPA, EDTA, HEDTA, GLDA, CDTA, and MGDA, and salts thereof, and
    (b) at least one converting agent selected from the group consisting of potassium carbonate ($K_2CO_3$), potassium formate (HCOOK), potassium hydroxide (KOH), and cesium formate (HCOOCs),
    (c) a liquid aromatic solvent as a dispersed phase for solid or semisolid organic materials, and
    (d) an effective amount of at least one emulsifier to form an emulsion,
    wherein a weight ratio of the at least one chelating agent and the at least one converting agent lies in the range 7-60:2-20,
    wherein the at least one chelating agent and the at least one converting agent are dissolved in an aqueous solution as a continuous phase, and
    wherein the iron sulfide scale comprises at least ogre selected the group consisting of pyrrhotite ($Fe_7S_8$), troilite (FeS), marcasite ($FeS_2$), pyrite ($FeS_2$), greigite ($Fe_2S_4$), and mackinawite ($Fe_9S_8$).

2. The method of claim 1, further comprising:
acidifying the composition containing the dissolved iron sulfide scale to form a precipitant of the at least one chelating agent and a precipitant of at least one insoluble iron salt,
isolating the precipitant of the at least one chelating agent and the precipitant of at least one insoluble iron salt from the composition,
selectively dissolving the precipitated at least one chelating agent in another composition, and
removing the precipitated at least one insoluble iron salt from the another composition.

3. The method of claim 1, wherein the composition comprises at least one chelating agent selected from the group consisting of DTPA, EDTA, HEDTA, and CDTA, and salts thereof.

4. The method of claim 1, wherein at least about 70% the iron sulfide scale is removed from the surface in fluid communication with the wellbore and/or subterranean formation.

5. The method of claim 1, wherein the wellbore has a bottom hole temperature in the range of from about 100° F. to about 400° F.

6. The method of claim 1, wherein the contacting lasts at least 24 hours.

7. The method of claim 1, wherein the composition further comprises at least one surfactant.

8. The method of claim 1, wherein the liquid aromatic solvent comprises at least one selected from the group consisting of toluene, benzene, and xylene.

9. The method of claim 1, wherein the at least one emulsifier comprises at least one selected from the group consisting of a polyamide emulsifier having the $R^3O-C(O)-R^4-C(O)-N(R^1)-(CH^2)_n-NH-C(O)-R^2$ (where $R^1$ and $R^2$ are independently selected from $C_{10}$-$C_{24}$ alkylene groups, $R^3$ is a hydrogen or a $C_1$-$C_5$ alkyl group, $R^4$ is a $C_1$-$C_5$ alkyl/alkene group and n is an is of from 2-5), a phosphate ester of an ethoxylated straight chain alcohol containing 8 to 10 carbon atoms and containing ethylene oxide in reacted form at a 4:1 or greater molar ratio relative to the straight chain alcohol, and a phosphate ester of an ethoxylated tridecyl alcohol containing ethylene oxide in reacted form at a 6:1 or greater molar ratio relative to the tridecyl alcohol.

10. The method of claim 1, wherein a volume proportion of the aqueous solution as the continuous phase to the liquid aromatic solvent as the dispersed phase ranges from about 80:20 to about 50:50.

11. The method of claim 1, wherein the wellbore is present in at least one of an oil well, a gas well, a production well, an injection well, a naturally flowing well, an artificially lifted well, a high temperature well, a steam assisted gravity drainage well, a steam injector well, and a geothermal well.

12. The method of claim 1, wherein the surface in fluid communication with the wellbore and/or subterranean formation comprises a surface of an oil and/or gas reservoir, a geological surface, and/or a surface of at least one piece of equipment selected from the group consisting of heating turbines, heat exchangers, safety valves, casings, production tubing, mandrels, pipes, separators, pumps, tubulars, vessels, completion equipment, screens, and downhole tools.

\* \* \* \* \*